Nov. 1, 1949     W. L. DE BAUFRE     2,486,825

NONRETURN VALVE FOR LOW-TEMPERATURE

Filed Dec. 26, 1944

INVENTOR

Wm. L. de Baufre

Patented Nov. 1, 1949

2,486,825

UNITED STATES PATENT OFFICE 2,486,825

NONRETURN VALVE FOR LOW TEMPERATURE

William Lane De Baufre, Lincoln, Nebr.

Application December 26, 1944, Serial No. 569,831

10 Claims. (Cl. 277—60)

This invention relates to non-return valves for use at low temperature in plants for extracting oxygen from atmospheric air and is particularly applicable to the process and apparatus described and claimed in application Serial No. 559,620, filed October 20, 1944, and Serial No. 569,830, filed December 26, 1944. In the former application, eight separate valves are shown for changing overflows of compressed air to be separated by rectification and returning nitrogen-rich gases separated therefrom. In the latter application, four of these valves are replaced by a manually-operated four-way valve and the remaining four valves are replaced by automatically operated non-return valves. The four-way valve and two of the non-return valves can be located where room temperature prevails so that they are readily accessible. The remaining two non-return valves, however, must be located where the temperature is very low and must therefore be imbedded in insulation to reduce heat leak into the cold compressed air flowing through them.

These two non-return valves automatically control flow of compressed air out of one or another vessel into a common discharge pipe. One object of the present invention is to combine these two separate non-return valves into a single three-way valve to simplify connections and reduce pressure drop.

Due to particles of ice and solid carbon dioxide separated at low temperature from compressed air flowing through these non-return valves, the valve disks are liable to stick in closed or open positions. The principal object of the invention is to provide a mechanism for determining whether the valve disks are stuck in closed or open positions and for freeing them for normal automatic operation without removing insulation from around the valve body.

At times, it may be desirable forcibly to raise the valve disks from their seats or to lower the valve disks to their seats. Another object of the invention is to arrange the mechanism so that this can be done by an operating handle outside the insulation.

In normal operation, the valve disks must be free to rise from their seats with excess pressure below the valve disks and free to fall to their seats with excess pressure above the valve disks. Another object of the invention is to arrange the mechanism for forcibly moving the valve disks in a manner that will not nterfere with their normal free motion.

A further object of the invention is to provide a mechanism for two valve disks in a single valve body which can be controlled by a single operating shaft extending through the insulation to reduce heat leak from the surroundings to the cold mechanism and simplify the manipulation.

It is to be understood that many of the features described and claimed can be applied to single non-return valves as well as to the three-way valve described. Also, these features are applicable to non-return valves at room temperature where insulation is unnecessary.

The foregoing objects together with such additional and subsidiary advantages as may hereinafter appear or are incident to the invention, are realized by the novel apparatus described herein and shown in prefererd form on the drawings as follows.

Figure 1:
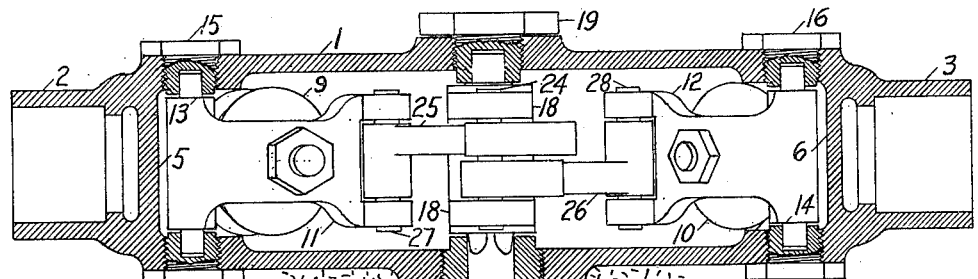
Figure 1 is a horizontal section through the three-way valve body at varying levels in order to reveal the two valve disks, one open and the other closed, with the operating mechanism and shaft extending through insulation to a handle exterior thereto.
Figure 2:
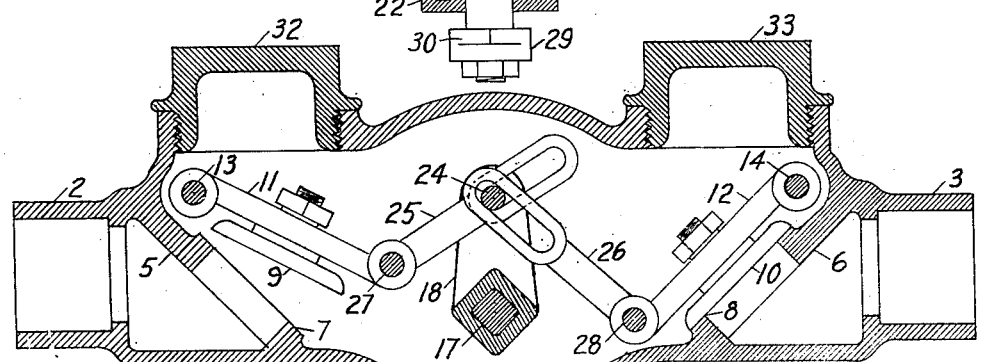
Figure 2 is a vertical section through the center of the valve body in order to reveal the operating mechanism and valve disks and seats, and show the relations of these valve disks and seats to the two inlets and the outlet in the valve body, and also the provision for inserting moving parts into the valve body.
Figure 3:
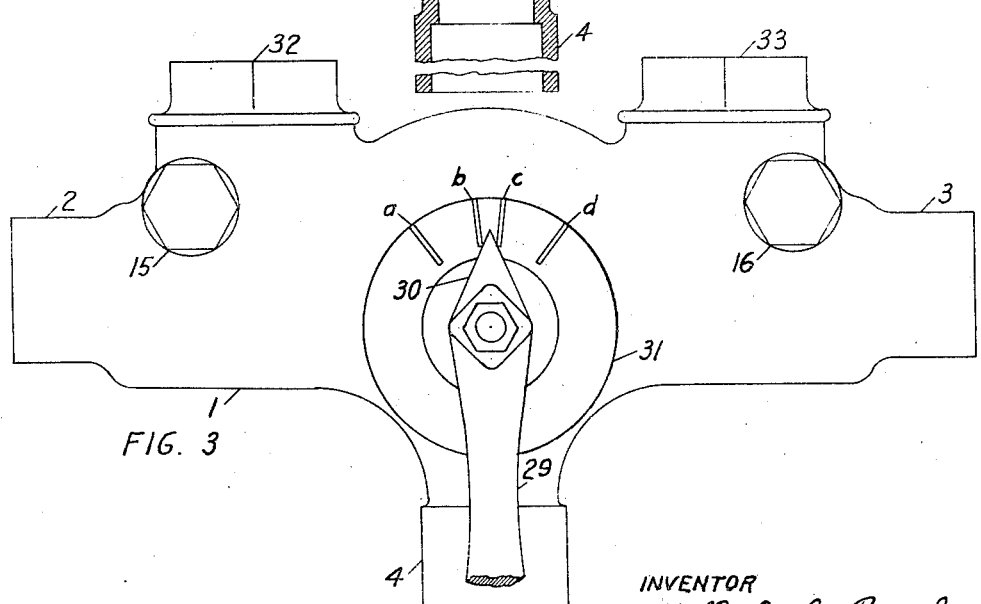
Figure 3 is a front elevation of the valve body showing the operating handle with pointer and reference disk to indicate when the valve disks are closed or open and when the handle is in position for automatic functioning.

Referring to these figures, valve body 1 has inlets 2 and 3 and outlet 4. These inlets and outlet are shown counter-bored for soldered connections to copper tubing although screwed or flanged connections can be used if desired. Valve body 1 contains inclined partitions 5 and 6 with openings therethrough from inlets 2 and 3 respectively. The upper edges of these openings constitute valve seats 7 and 8 on which valve disks 9 and 10 rest to close the openings from inlets 2 and 3 respectively.

Valve disks 9 and 10 are loosely connected to arms 11 and 12 which can turn freely on pins 13 and 14 supported in plugs 15 and 16 screwed into valve body 1. When the fluid pressure below the valve disk is in excess over the fluid pressure above the valve disk, the valve disk swings open, as shown for valve disk 9 to permit flow of fluid through inlet 2. When the fluid pressure above the valve disk is in excess over the fluid pressure below the valve disk, the valve disk swings closed as shown for valve disk 10 to prevent return flow of fluid through inlet 3. This is the normal operation for swing check valves and the operating mechanism to be described is arranged to interfere with this normal operation only to the slightest degree if at all.

An operating shaft 17 projects into valve body 1 between the two valve disks 9 and 10. Within the valve body, this shaft is square in cross-section where it extends through the hub of double crank arm 18. At the end, the square portion is turned down for rotation in the support provided by plug 19 in valve body 1. Shaft 17 is round in section where it projects through tube 20 within insulation 34. Shaft 17 and tube 20 are of Monel metal to reduce heat leak from the surroundings to the operating mechanism at low temperature. Stuffing box 21 at the outer end of tube 20 contains leather packing to prevent leakage along shaft 17. This packing is held in place by packing gland nut 22. Shaft 17 has a collar 23 which turns in the bottom of stuffing box 21 and keeps the shaft in place longitudinally in the valve body while permitting it to turn in tube 20 and plug 19.

The square section of shaft 17 where it passes through a square hole in the hub of double arm 18 causes the double arm to rotate with the shaft when it is turned by handle 29. Double arm 18 carries pin 24 near its outer end. Two slotted links 25 and 26 have pin 24 projecting through the slots. Links 25 and 26 are attached by pins 27 and 28 to swinging arms 11 and 12 respectively. Links 25 and 26 can turn freely on pins 27 and 28 and the slots in links 25 and 26 can slide freely over pin 24 until this pin reaches the ends of the slots. The hubs on links 25 and 26 are long so that these links will retain their relative positions, one link on one side of the center of the valve body and the other link on the other side, without interference during motion of the mechanism.

In the positions shown in the several figures, the center of pin 24 is vertically above the center of shaft 17 with operating handle 29 extending vertically downward. Valve disk 9 has opened by reason of excess pressure below the disk until the end of the slot in link 25 presses against pin 24. Valve disk 10 has closed by reason of excess pressure above the disk. Pin 24 is not quite at the end of the slot in link 26 so that there is no interference with tight closure of valve disk 10 on its seat 8.

Pin 24 can be moved a small distance with counter-clockwise movement of shaft 17 and handle 29 until pin 24 would be at the end of the slot in link 26. This position is marked on dial 31 by ridge $b$. If operating shaft 17 and handle 29 were turned clockwise, pin 24 would eventually reach the other end of the slot in link 26. This position is marked by ridge $d$ on dial 31. For any position of pointer 30 between ridges $b$ and $d$, valve disk 10 might be resting on its seat 8. When pointer 30 is forcibly moved by handle 29 to ridge $d$ valve 10 has been forcibly lowered to its seat 8. When pointer 30 forcibly moved counter-clockwise beyond ridge $b$, valve disk 10 has been forcibly raised from its seat 8.

The amount of opening of valve disk 9 is limited by the position of pin 24. At any position of pointer 30 between ridges $b$ and $d$, the maximum opening of valve disk 9 is limited without interference with the closing of valve disk 10. This makes possible throttling the flow through inlet 2 within these limits without permitting return flow through inlet 3.

Ridge $a$ corresponds to the closed position of valve disk 9. If valve disk 9 were stuck in any open position, this would be indicated by handle 29 meeting resistance to turning counter-clockwise at a position of pointer 30 short of reaching ridge $a$. By forcibly rotating handle 29, valve disk 9 could be freed so that it would then operate automatically with reversal of fluid flow. Ridge $c$ corresponds to the extreme position of handle 29 for valve disk 9 closed. Valve disk 9 might be closed at any position of pointer 30 between ridges $a$ and $c$. With valve disk 9 closed, throttling by valve disk 10 can be regulated for flow through inlet 3 by the position of pointer 30 between ridges $a$ and $c$.

The mechanism thus indicates by the position to which pointer 30 can be easily turned whether either valve is stuck closed or open. Clockwise rotation of pointer 30 to ridge $c$ only ordinarily indicates that valve disk 9 is stuck closed. Counter-clockwise rotation of pointer 30 to ridge $b$ only ordinarily indicates that valve disk 10 is stuck closed. In either case, the other valve disk might be stuck open. Resistance to rotation at any other point indicates that one of the valve disks is stuck open.

Whether a valve disk is stuck closed or open, forcible movement of handle 29 will free the stuck valve disk so that it can operate normally again. Also, by this mechanism either valve disk can be forcibly closed and the other valve disk can be forcibly opened. The automatic non-return feature of each valve disk can function normally when pointer 30 is between ridges $b$ and $c$.

Many of the above features of the three-way valve can be applied to a single non-return valve. However, if two single non-return valves would be required, the three-way valve offers a simpler solution. A more compact arrangement is secured with less pipe connections to be made. Only one operating handle is necessary in the three-way valve as compared with two operating handles for two single valves, thereby reducing heat leak into the system through the operating shafts and tubes.

In the three-way non-return valve shown in the figures, outlet 4 is placed at the bottom of valve body 1. This is done to reduce pressure drop from either inlet to the outlet. With each valve disk swinging about an axis above its valve seat, entering fluid flows mainly under the lower edge of the open valve disk. The natural path of flow is therefore to a bottom outlet, which also keeps the flowing fluid away from the operating mechanism, reducing the danger of depositing particles of ice and solid carbon dioxide thereon. The operating mechanism is in stagnant fluid above the flowing stream carrying particles of ice and solid carbon dioxide. If the outlet were at the top of the valve body, the flow would be over the mechanism and would be obstructed thereby. Generous curvature is provided in the valve body leading to outlet 4 in order to reduce loss of pressure due to whirls and eddies in the flowing fluid.

Support for the end of shaft 17 is provided in plug 19 in order to reduce the danger of distortion of the operating mechanism when forcibly moving a stuck valve disk. By boring the holes in the valve body for plug 19 and for the base of tube 20, the bearings for shaft 17 are lined up accurately. If the two holes were bored and threaded alike, the operating shaft could be inserted from either side.

Threaded openings with screwed caps 32 and 33 are provided for inserting the moving parts and assembling them within valve body 1. Valve disks 9 and 10 can be ground to tight fits on their seats 7 and 8 by inserting tools through these openings. It would also be possible to provide a removable plug at the center of the dome on the valve body in order to have an opening for a grinding tool more nearly in the axis of each valve disk.

I claim:

1. Non-return three-way valve including a valve body, two inlets each closed by a swinging valve disk to prevent return flow of fluid through either inlet, two slotted links one connected to each valve disk, a pin passing through the slots in both links and attached to a crank arm on a shaft extending through the wall of the valve body, and an external handle for rotating the shaft, the lengths of the slots in the two links being such that by turning the external handle in one direction the pin is brought to press against one end of the slot in one link to forcibly open the valve disk to which this slotted link is connected or by turning the external handle in the opposite direction the pin is brought to press against the other end of the slot to forcibly close the valve disk.

2. Non-return three-way valve as in claim 1 including a pointer on the external handle and a stationary dial marked to indicate the positions of the pointer with the pin attached to the crank arm at the ends of the slot in each link when the corresponding inlet is closed by the valve disk.

3. Non-return three-way valve as in claim 1 wherein the lengths of the slots in the two links are such that with the external handle in an intermediate position either valve disk can open automatically with excess pressure under the disk to permit flow of fluid through the inlet and close automatically with excess pressure above the valve disk to prevent return of fluid through the inlet.

4. Non-return three-way valve as in claim 1 wherein the lengths of the slots in the two links are such that with the external handle in an intermediate position the movement of either valve disk is limited by the end of the slot in the link attached to the valve disk coming into contact with the pin.

5. Non-return three-way valve as in claim 1 including an outlet from the bottom of the valve body whereby most of the fluid flowing in through either inlet reaches the outlet without flowing across the slotted links.

6. Non-return three-way valve including a valve body, two inlets each closed by a valve disk loosely held on a swinging arm turning around a pin with bearings in the valve body, two slotted links each connected to one of the swinging arms, a pin projecting through both slots and attached to a crank arm on a hub mounted on a shaft projecting through the hub and through one wall of the valve body, a bearing in the wall supporting the shaft projecting therethrough, and an operating handle on the outer end of the shaft, the lengths of the slots being such that one valve disk can be forcibly opened and the other valve disk forcibly closed by turning the operating handle in one direction and the first valve disk can be forcibly closed and the second valve disk forcibly opened by turning the operating handle in the opposite direction.

7. Non-return three-way valve as in claim 6 wherein the slotted links are pin-connected to the swinging arms and have long hubs through which the pins pass to retain the slotted links in their proper relative positions to prevent interference during motion.

8. Non-return three-way valve as in claim 6 wherein the crank arm is double with the pin between the two arms projecting through the slots of both links.

9. Non-return valve imbedded in insulation for operation at low temperature and including a valve body, an inlet closed by a valve disk loosely held on a swinging arm turning around a pin with bearings in the valve body, a slotted link connected to the swinging arm, a pin projecting through the slot and attached to a crank arm on a hub mounted on a shaft projecting through the hub and through one wall of the valve body, a bearing in the wall supporting the shaft projecting therethrough, and an operating handle on the outer end of the shaft outside the insulation, the length of the slot being such that the valve disk can be forcibly opened by turning the operating handle in one direction to rotate the shaft until the pin is pressed against one end of the slot, and the valve disk can be forcibly closed by turning the operating handle in the opposite direction to rotate the shaft until the pin is pressed against the other end of the slot.

10. Non-return valve imbedded in insulation for operation at low temperature as in claim 9 wherein the shaft is of Monel metal and extends through a Monel metal tube through the insulation whereby heat leak is reduced from the surroundings at room temperature to the valve and its mechanism at low temperature.

WILLIAM LANE DE BAUFRE.

REFERENCES CITED

The following references are of record in the file of this patent:

UNITED STATES PATENTS

| Number | Name | Date |
| --- | --- | --- |
| 1,001,111 | Wood | Aug. 22, 1911 |
| 1,367,911 | Koplin | Feb. 8, 1921 |
| 1,483,081 | Dean | Feb. 12, 1924 |
| 1,814,762 | Mochel | July 14, 1931 |
| 1,858,766 | Dabroski | May 17, 1932 |
| 2,010,201 | Ruttiman | Aug. 6, 1935 |
| 2,062,781 | De Baufre | Dec. 1, 1936 |
| 2,251,414 | Neal | Aug. 5, 1941 |
| 2,274,917 | Carlson | Mar. 3, 1942 |